United States Patent

Petrohilos

[15] 3,665,305

[45] May 23, 1972

[54] ANALOG TO DIGITAL CONVERTER WITH AUTOMATIC CALIBRATION

[72] Inventor: Harry G. Petrohilos, Yellow Springs, Ohio

[73] Assignee: United Systems Corporation, Dayton, Ohio

[22] Filed: Feb. 24, 1970

[21] Appl. No.: 13,621

[52] U.S. Cl. ........................324/99 D, 324/130, 340/347 AD

[51] Int. Cl. ........................................G01r 17/06, G01r 1/02

[58] Field of Search .............324/130, 99, 99 D; 340/347 AD

[56] References Cited

UNITED STATES PATENTS

| | | | |
|---|---|---|---|
| 2,897,486 | 7/1959 | Alexander et al. | 324/99 D |
| 2,824,285 | 2/1958 | Hunt | 324/99 D |
| 2,787,418 | 4/1957 | MacKnight et al. | 324/130 X |

*Primary Examiner*—Rudolph V. Rolinec
*Assistant Examiner*—Ernest F. Karlsen
*Attorney*—Marechal, Bieber, French & Bugg

[57] ABSTRACT

In a digital voltmeter, a single comparator circuit compares the output of a linear ramp generator with a first reference voltage, an unknown input voltage, and a second reference voltage to define a time ratio, which is independent of the slope of the ramp generator voltage, from which the magnitude of the unknown input voltage can be determined. A gate controlled oscillator generates a predetermined number of pulses in the reference time interval (i.e., the time interval between ramp voltage coincidence with the first and second reference voltages), and a feedback circuit is employed to maintain the number of pulses generated during this time interval constant regardless of any variations in the time interval. A smaller number of pulses representing the voltage ratio of unknown input voltage to the reference voltages is then applied to a conventional digital voltmeter display device.

13 Claims, 13 Drawing Figures

*INVENTOR*

HARRY G. PETROHILOS

*BY*

Marechal, Biebel, French & Bugg

*ATTORNEYS*

Ein POSITIVE

VOLTAGE TO TIME WAVEFORMS

Ein NEGATIVE

VOLTAGE TO TIME WAVEFORMS

FREQUENCY HIGH

AUTOMATIC FREQUENCY CONTROL WAVEFORM

FREQUENCY LOW

AUTOMATIC FREQUENCY CONTROL WAVEFORM

ANALOG TO DIGITAL CONVERTER WITH AUTOMATIC CALIBRATION

BACKGROUND OF THE INVENTION

In many digital voltmeters employing a ramp generator, the output voltage of which varies linearly with respect to time, a plurality of comparator circuits are used to sense coincidence of the ramp voltage with the unknown input voltage and with a reference voltage. These comparator circuits control a gate which permits pulses from an oscillator to be directed to a digital display indicator, with the number of pulses passing through the gate being determined by the magnitude of the unknown input voltage. It is necessary, therefore, that the slope or rate of change of voltage with respect to time of the ramp generator be accurately maintained since any change in slope will result in a different number of pulses passing through the gate to the digital display indicator. Also, the frequency of the oscillator must be accurately controlled since it determines the number of pulses in any unit of time. Any variations in the slope of the ramp generator output voltage or in the frequency of the oscillator in these devices will therefore result in an inaccurate determination of the unknown input voltage.

SUMMARY OF THE INVENTION

This invention relates to an improved analog to digital converter which includes an automatic calibrating feature to render the converter output independent of the slope of a ramp generator output signal and which includes a single comparator circuit to compare the ramp generator output signal to first and second reference signals and to an unknown input signal.

The analog to digital converter of this invention is a time ratio device wherein the time interval between coincidence of a ramp generator output signal with first and second reference signals and the coincidence of the ramp output signal with an unknown input signal is compared. As long as the ramp output signal varies at a linear rate with respect to time, the actual rate of change or slope of the ramp output signal will not adversely affect the digital output from the device.

A pulse generator or oscillator generates a predetermined number of pulses in a reference time interval, i.e., the time interval between ramp generator output signal coincidence with the first and second reference signals, and a feedback circuit is employed to maintain constant the number of pulses generated during the reference time interval regardless of any variations in the time interval. Feedback control may be accomplished by controlling the frequency of the oscillator or by controlling the slope of the ramp generator output signal.

In the preferred embodiment, the pulse generator output is applied to a counter circuit which divides the number of pulses by a predetermined number. The counting sequence is initiated upon the coincidence of the ramp generator output signal with the first reference signal. An output from the counter is directed to a phase comparator which compares this output with a signal generated upon the coincidence of the ramp generator output signal with the second reference signal. The output of the phase comparator is a voltage directed to control the frequency of the pulse generator so that the number of pulses produced during the reference time interval is maintained constant regardless of the length of time interval (which will be determined by the slope of the ramp generator output signal). The pulse generator is a voltage controlled oscillator which is clamped and prevented from oscillating until the ramp generator output signal coincides with the first reference signal and the counting sequence initiated. This insures that the oscillator waveform begins with the same phase for each measuring interval.

The first and second reference signals are positive and negative signals of the same magnitude and therefore a zero level will be created exactly midway in the reference time interval. Another output from the same pulse generator is applied to a gate circuit which is opened only during the time interval between the coincidence of the ramp generator output signal with the unknown input signal and the zero level. The magnitude of the input signal is represented by the length of this time interval. The polarity of the input signal will be determined by the sequence of these two events. Thus, with a negative going ramp signal, a positive input will be indicated by coincidence of the ramp signal with the input signal before the zero level is reached. A negative input will be indicated by the occurrence of the zero level prior to coincidence of the ramp signal with the unknown input.

The pulse output from the gate circuit is directed to a conventional digital display which converts the number of pulses passing through the gate circuit into useable form, such as a visible display.

Accordingly, it is an object of this invention to provide an improved analog to digital converter of the type described wherein the time interval between the coincidence of a ramp generator output signal with first and second reference signals is compared to the coincidence of the ramp generator output signal with an unknown input signal to define a time ratio which is independent of the slope or rate of change of the ramp generator output signal with respect to time and which represents the magnitude of the input with respect to the references; to provide an improved analog to digital converter of the type described wherein a pulse generator supplies a fixed, predetermined number of pulses during a reference time interval, i.e., the time interval between coincidence of the ramp generator output signal with first and second reference signals, and wherein a feedback circuit is employed to control either the frequency of the pulse generator or the slope of the ramp generator output signal to maintain constant the number of pulses generated during the reference time interval regardless of any variations in the time interval; and to provide an improved analog to digital converter particularly for use with digital voltmeters which includes a counter circuit responsive to the output from a pulse generator and to the reference time interval, operation of the counter circuit being initiated upon the coincidence of the ramp generator output signal with the first reference signal and providing an output upon the completion of a predetermined number of pulses from the pulse generator, and a comparator circuit responsive to the output of the counter circuit and to the coincidence of the ramp generator output signal with the second reference signal, the comparator circuit providing a control signal to the pulse generator to adjust its frequency in a direction to maintain the number of pulses in the reference time interval at the predetermined number.

Other objects and advantages of the invention will be apparent from the following description, the accompanying drawings and the appended claims.

BRIEF DESCRIPTION OF THE DRAWINGS

FIG. 6*b* is a set of waveforms showing the action of the feedback circuit to control automatically the frequency of the voltage controlled oscillator when its frequency is low.

DESCRIPTION OF THE PREFERRED EMBODIMENTS

Figure 1:
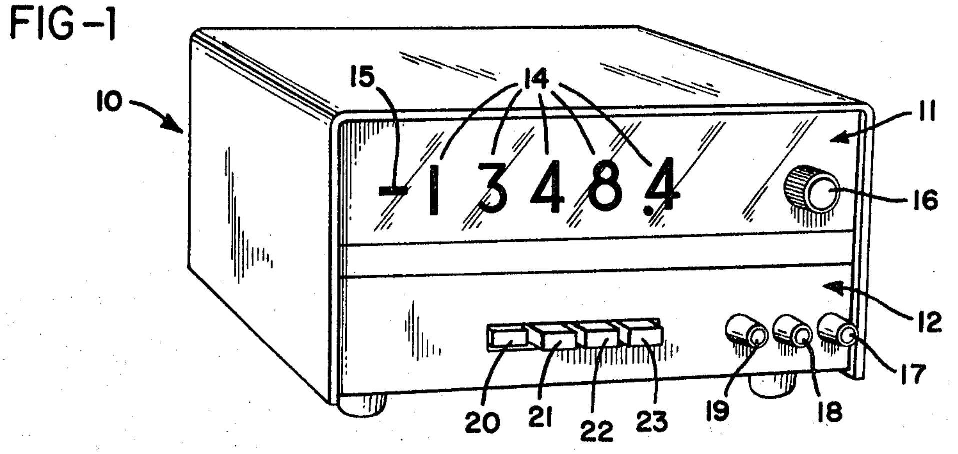
FIG. 1 is a perspective view of a digital voltmeter incorporating the invention.

Referring now to the drawings which illustrate preferred embodiments of the invention, a digital voltmeter is illustrated in FIG. 1 and includes a housing 10 which is divided into upper and lower sections 11 and 12. The upper section 11 is the main frame of the instrument and includes five numeric display tubes 14, a polarity indicator 15, and a combination on-off and sample rate control switch 16. The upper section 11 also contains power supplies and interrogating circuits for both the main frame and the circuits contained in the lower section 12.

The lower section 12 of the instrument includes input terminals 17–19 and voltage range selection switches 20–23. In the preferred embodiment, the lower section 12 is a plug in module containing the analog to digital converter circuit constructed according to this invention.

In operation, an unknown voltage Ein is connected to terminals 17 and 18. Terminal 19 is chassis ground and is normally connected to terminal 18 by a jumper bar to enable use of the voltmeter as a single ended instrument. The voltage range selection switch 23 for the highest range of the instrument is initially closed. The on-off and sample rate control switch 16 is turned on and the voltage input will then appear on the display tubes 14. The rate at which the unknown voltage is measured is determined by the position of the rate control switch 16 and usually varies between one to eight samples per second. After the voltage range of the unknown input is ascertained, the voltage range selection switch giving the best resolution should be closed.

Figure 2:
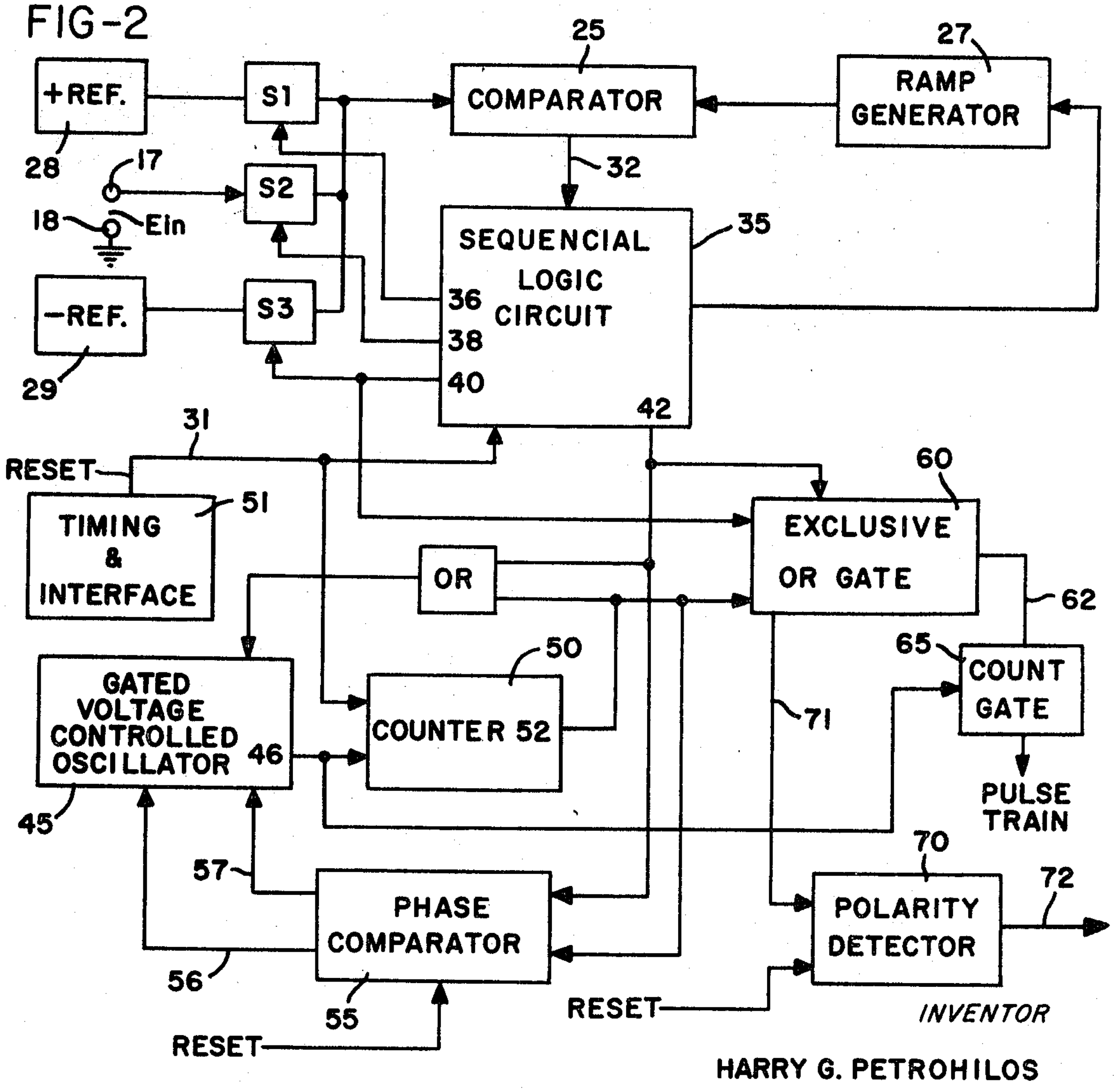
FIG. 2 is a block diagram of the improved analog to digital converter circuit of the present invention wherein the frequency of a voltage controlled oscillator is adjusted to maintain a fixed constant number of pulses within the reference time interval.

The unknown analog voltage input to the voltmeter is converted into digital form by the analog to digital converter circuit shown in the block diagram of FIG. 2 and the detailed electrical schematic diagram of FIG. 7. This circuit includes a single comparator circuit 25 which compares a negative going ramp voltage, which is created by a ramp generator 27 first to a positive reference voltage 28, next to the unknown input voltage Ein, and finally to a negative reference voltage 29.

The positive reference voltage is derived by dividing + 9.4 volt reference voltage from Zener D1 down to + 1.6384 volts. The negative reference is derived by applying the +9.4 volt reference from D1 to amplifier 1C4A with appropriate feedback to produce −1.6384 volts.

The comparator 25 is an amplifier fed by two matched field effect transistors, source followers, Q17 and Q18. The amplifier compares the two inputs and produces an output swing of ±10 volts. Diode D7 is used to clamp the negative swing of the amplifier, thus protecting one shot 1C8A. The ramp generator 27 generates a negative going voltage which changes at a linear rate, the magnitude of which initially exceeds the positive reference voltage 28 and eventually becomes more negative than the negative reference voltage 29. The slope or rate of change in the ramp generator will not affect the digital output of the circuit since any changes in slope will be automatically compensated for by the circuit.

The ramp generator 27 includes transistors Q13, 14, 15 and Darlington Q16, connected to produce a high gain amplifier. Frequency compensation is performed with C12, R51 and C13. By using capacitive feedback, the amplifier becomes a highly linear ramp generator.

The ramp generator is initiated by either Q12 or Q11, depending on the conditions of the circuit. During normal operation, the ramp generator is reset by the ramp gate which is produced when the ramp crosses the negative reference voltage. When transistor Q12 or Q11 saturates, the ramp is reset to its most positive level. The ramp voltage then remains in the reset state until the next reset pulse is received from the timing and interface section 51.

If, for some reason, the ramp does not produce three distinct voltage crossings (i.e., positive reference, input, negative reference), a normal reset gate would not be generated and the instrument would lock up. To prevent this, an independent encode ramp gate is provided which resets the ramp generator.

Figure 5A:
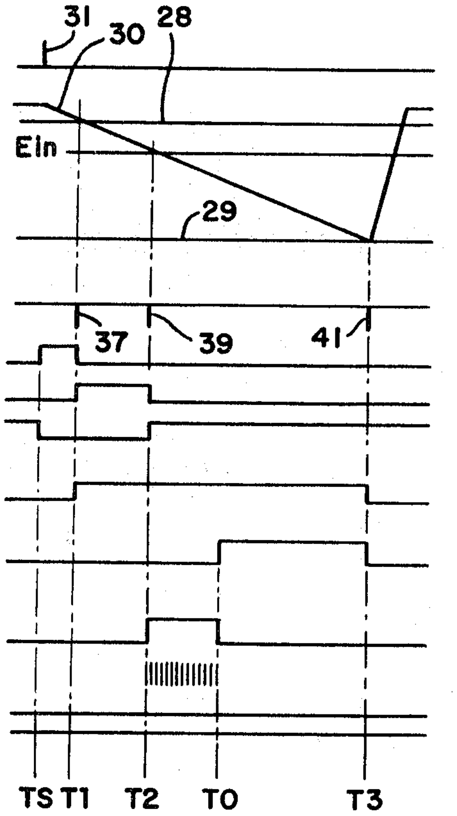
FIG. 5*a* is a set of waveforms showing the voltages within selected portions of the circuit with respect to time for a positive input voltage.
Figure 5B:
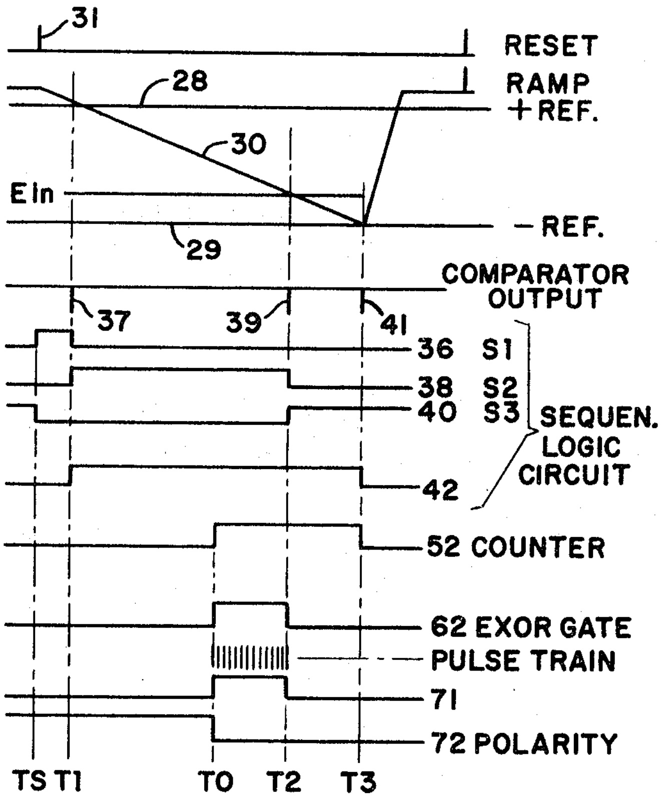
FIG. 5*b* is a set of waveforms showing the voltages within selected portions of the circuit with respect to time for a negative input voltage.

Referring briefly to FIGS. 5*a* and 5*b*, the output of the ramp generator 27 is shown as a downward sloping line 30 which is started by a reset pulse 31 at time Ts. The ramp voltage first crosses the positive reference voltage 28 at time T1, the unknown input voltage Ein at time T2, and finally the negative reference voltage 29 at time T3.

The comparator 25 produces an output on line 32 to sequential logic circuit 35 whenever there is a coincidence of the voltage into the comparator with the ramp voltage. Therefore, the positive reference voltage is first connected to the comparator 25 through switch S1 which is closed by an enabling signal on line 36 from the sequential logic circuit 35. When the ramp voltage coincides with the positive reference voltage, or nearly coincides due to the threshold requirements of the comparator circuit, a first output pulse will be generated by the comparator, as represented by the pulse 37 in FIGS. *5a* and *5b* at T1. This first pulse is applied to the sequential logic circuit 35 which then removes the enabling signal from switch S1 and thereafter enables switch S2 by an appropriate output on line 38. Switch S2 remains closed until the ramp voltage coincides with the unknown input voltage Ein at which time (T2) the comparator produces a second output pulse 39 which, when applied to the sequential logic circuit 35 will open switch S2 and close switch S3 by an appropriate output on line 40. Switch S3 will then remain closed until the sequence is again initiated.

Switches S1, S2 and S3 are three field effect transistors, Q3, Q4 and Q2, respectively, and their associated drivers. To prevent any two of the three switches from being on at the same time, all three are turned off for a fixed amount of time before any switch is gated on. The logic for this operation is derived from decoders 1C9A, 1C9B, and 1C1A, 1C1C and 1C2A of the logic section, in conjunction with a one-shot in the comparator circuit.

When the ramp voltage 30 coincides with the negative reference voltage 29 at time T3, a third pulse 41 from the comparator 25 will be directed to the sequential logic circuit 35. The sequential logic circuit has an output terminal 42, and the output signal on this terminal represents the reference time interval T1–T3, or the time between the ramp voltage crossing the positive reference voltage and the negative reference voltage.

It will be apparent to those skilled in the art that the time ratio of T1–T2 to T2–T3, or T1–T2 to the total time T1–T3, will be independent of the slope of the reference voltage. Therefore the accuracy of the measurement of the unknown input voltage Ein will depend upon the linearity of the ramp voltage (but not its slope) and the accuracy of the reference voltages. It will also be apparent that the reference voltages do not have to be of the same magnitude but of opposite polarities, although for a practical instrument, this arrangement is preferred.

Since a digital output is desired, a pulse generating oscillator 45 is employed which produces pulses at a regular rate, typically in the order of 750 kHz. The oscillator 40 in the preferred embodiment of the invention is voltage controlled with its frequency determined by the inductance of L1 and the capacitance of a voltage variable capacitor or Zener D8. As will be explained, the frequency of oscillator 40 is adjusted to generate a constant number of pulses during the reference time interval T1–T3.

The pulse output from the oscillator 40 is carried by line 46 to a counter circuit 50 which divides the pulses by a predetermined number. In the preferred embodiment, counter 50 is a binary counter which divides the pulse output from the oscillator 40 into exactly one-half the number of pulses which are desired to be produced during the reference time interval. The binary counter consists of 15 idential J–K flip-flops, arranged as a binary ripple counter. This will allow an output of one pulse from 1C11C and 1C11D for every 16,384 pulses fed into 1C12B. It is to be understood, however, that other types of counting circuits could be employed in place of the binary counter shown in block diagram form in FIG. 2 and in detail in FIG. 7.

The counter 50 is initially reset at time Ts by a reset pulse 31 from a timing and interface circuit 51. The timing of this circuit is determined by the programmable unijunction transistor, Q29. This timing slaves the timing interval in the main frame 11, thus the on/update control 16 only affects updating of the digital display and not the sampling rate. This circuit has two outputs. One output is used for plug-in reset which resets all flip-flops in the binary counter and the two decoding flip-flops in the logic section, while the other output is used as an override for the ramp generator.

When the ramp voltage coincides with the positive reference voltage at time T1, the sequential logic circuit 35 will generate an output at terminal 42 to initiate the counting sequence. This is done by gating the oscillator 45 into operation. Prior to the counting sequence, current was allowed to flow continuously through inductor L1 by operation of transistors Q22 and Q23 (FIG. 7). When the reference time interval begins, this flow of current ceases, and the oscillator is then allowed to operate at its resonant frequency. The oscillator 45 therefore starts into oscillation with the same phase for each voltage measuring sequence which, as will be explained, enhances the accuracy of the instrument.

Figure 6A:
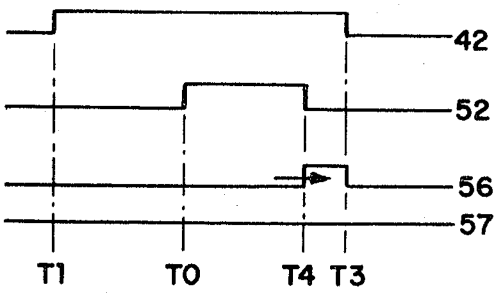
FIG. 6*b* is a set of waveforms showing the action of the feedback circuit to control automatically the frequency of the voltage controlled oscillator when its frequency is high.
Figure 6B:
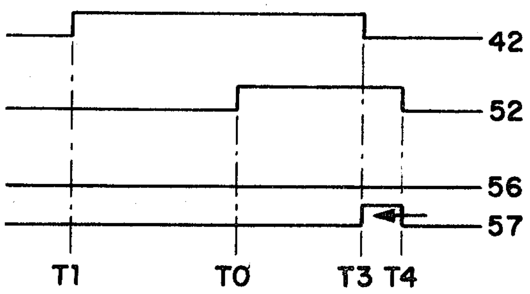
Figure 7A:
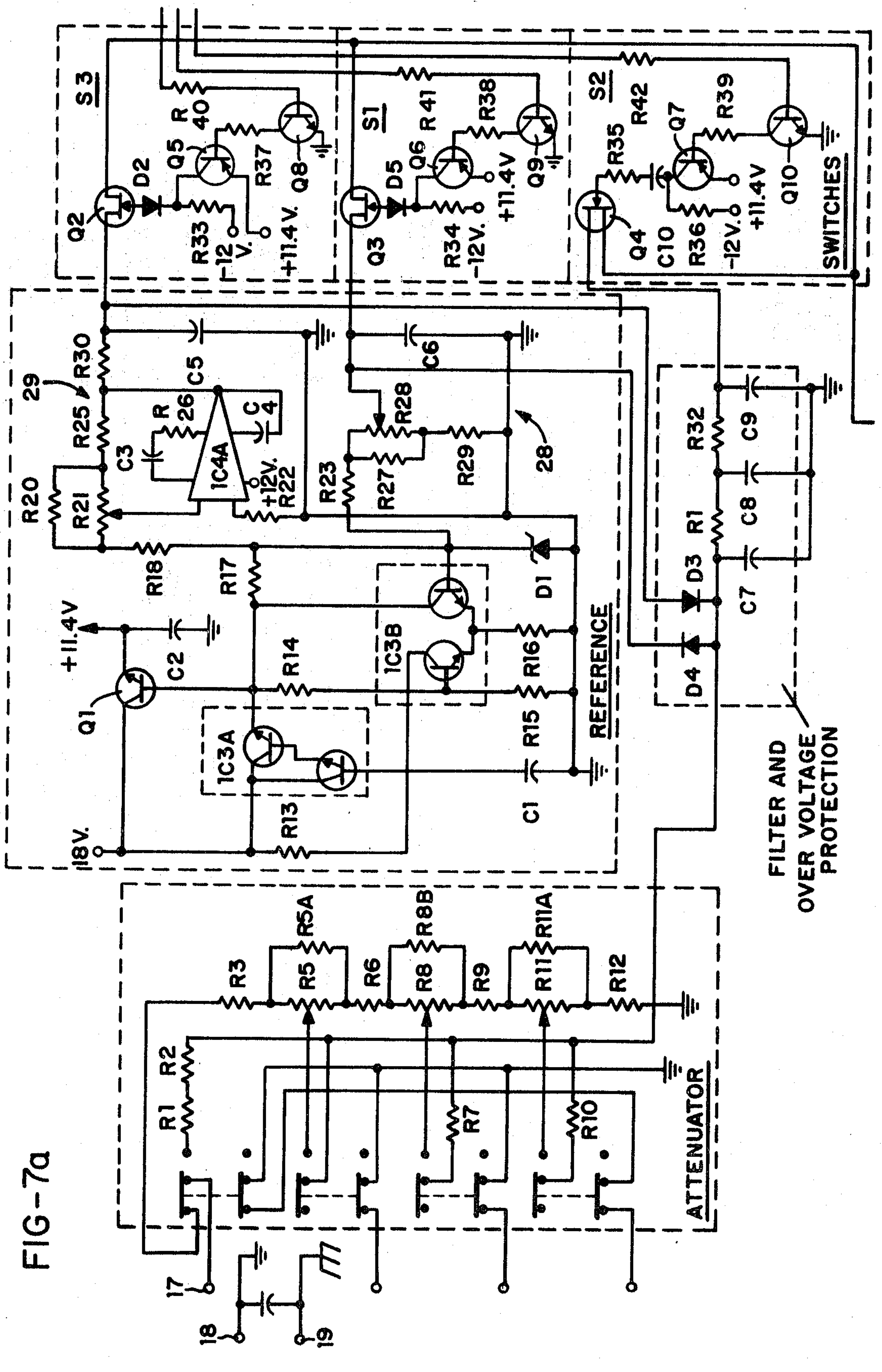
FIGS. 7*a*–7*d* taken together as shown in FIG. 8 comprise a detailed electrical schematic diagram of an analog to digital converter circuit.
Figure 7B:
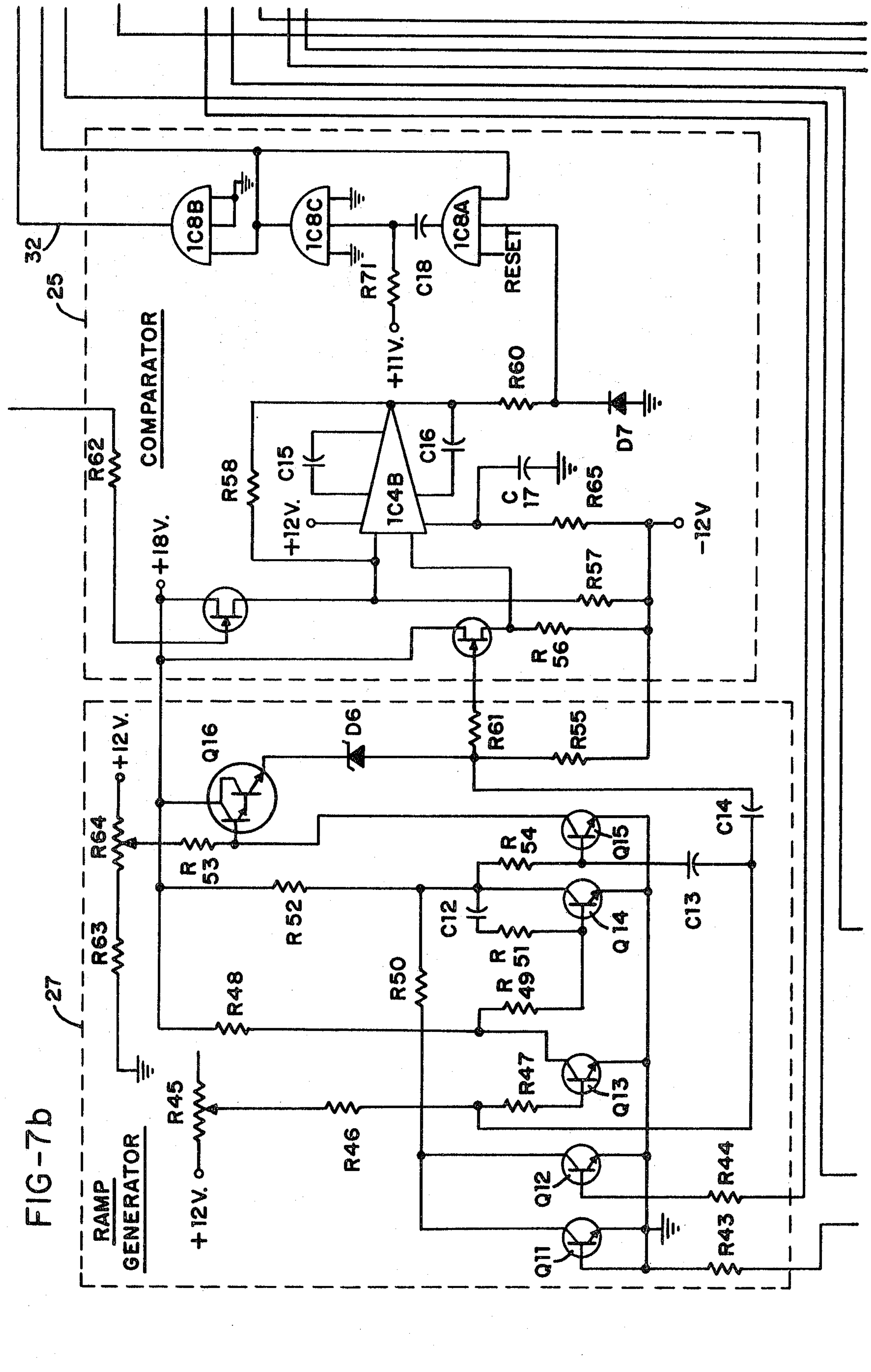
Figure 7C:
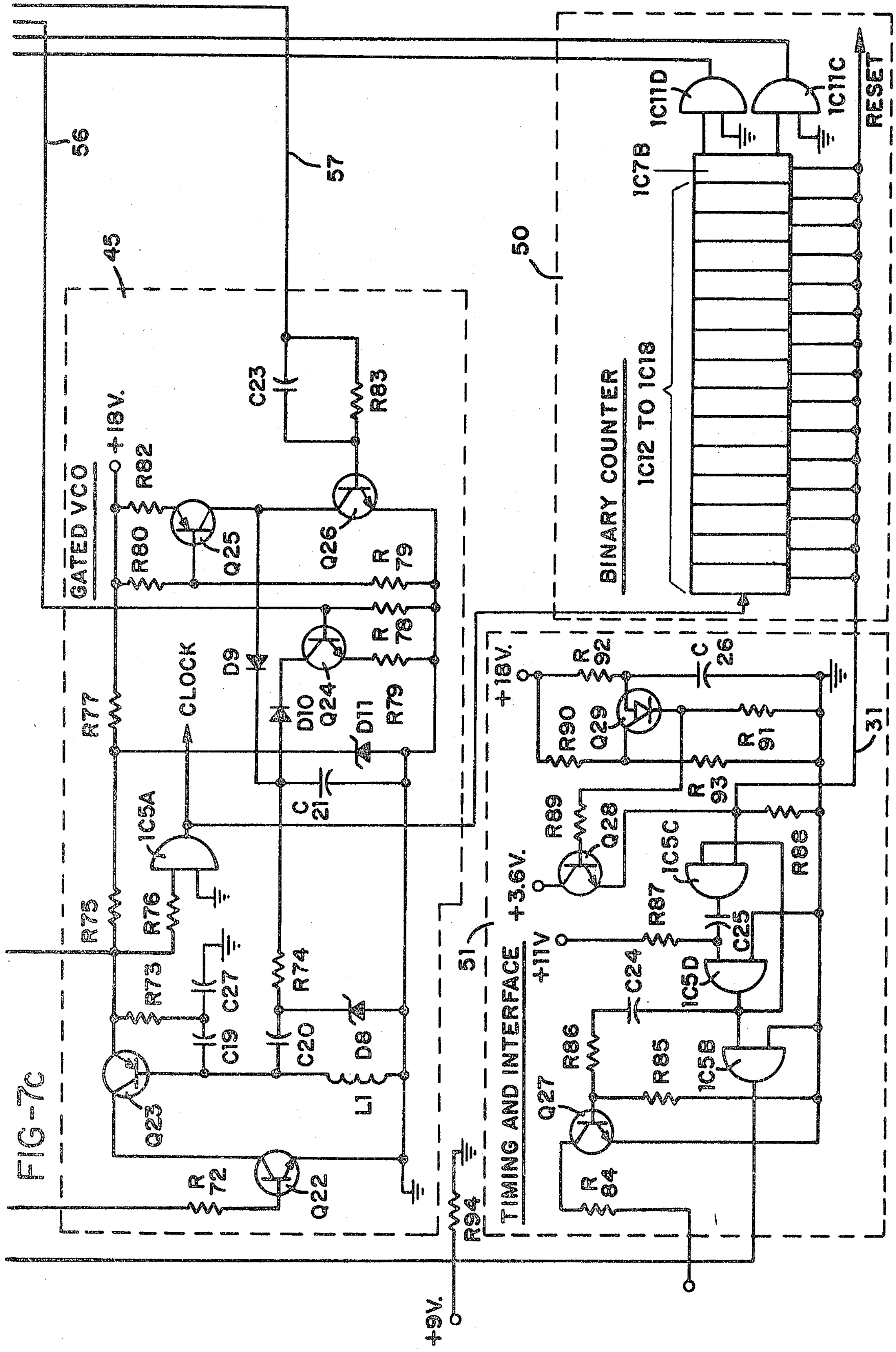
Figure 7D:
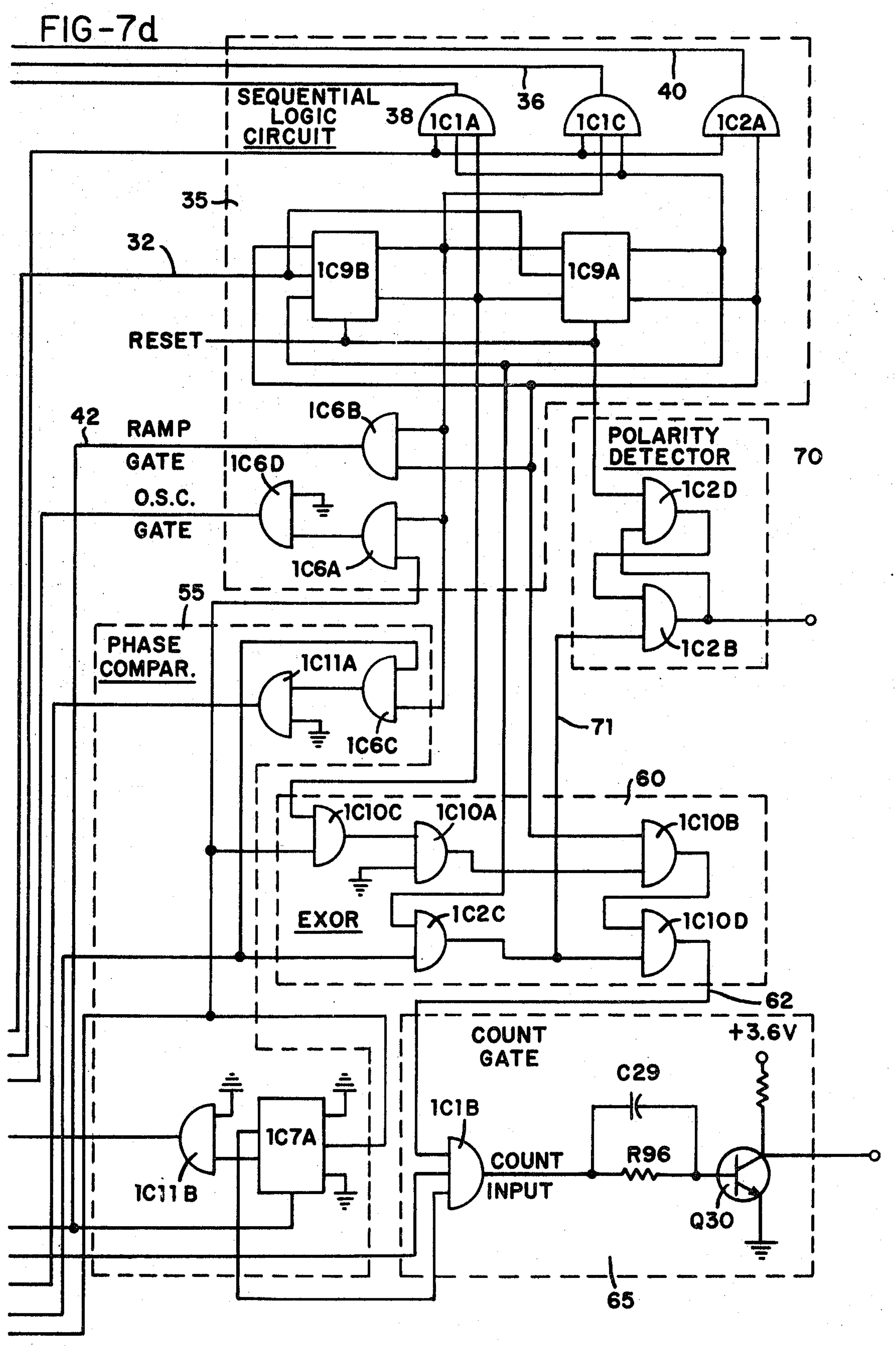

Since the counter 50 counts exactly one-half the number of pulses desired within the reference time interval, it may be seen from FIGS. 6*a* and 6*b* that it may be necessary to adjust the frequency of the oscillator 45. FIG. 6*a* illustrates the output on terminal 52 from the counter 50 when the frequency of the oscillator 45 is too high. Under these circumstances, the counter sequence is initiated at time T1, and after one-half of the desired number of pulses has been counted, the output on terminal 52 from the counter changes at time To. After the counter again counts one-half the desired number of pulses, its output on terminal 52 returns to its original condition at time T4. The output from the sequential logic circuit on terminal 42 on the other hand, does not change until time T3.

Both terminals 52 from the counter 50 and terminals 42 from the sequential logic circuit 35 are connected to a phase comparator circuit 55, and when the frequency of the oscillator is too high, time T4 will occur before time T3. As a result, a control signal from the phase comparator on line 56 will be created and applied to the control circuit for the voltage controlled oscillator. Referring to FIG. 7, this control signal is applied to transistor Q26 which then adjusts the voltage on capacitor C21 to control the resonant frequency of the oscillator. The length of the pulse output on line 56 is integrated by capacitor C21, and it is therefore apparent that several sampling cycles will be required to adjust the frequency of the oscillator to provide a completely accurate output in the event that a large frequency error exists.

FIG. 6*b* illustrates the waveforms which appear when the frequency of the oscillator 45 is too low initially. Under these conditions, T4 occurs after T3 and the phase comparator will create an output on line 57 the length of which determines the magnitude of the frequency increase required. Referring to FIG. 7, the output is applied to transistor Q24 which modifies the voltage on integrating capacitor C21 and thus the voltage on and capacitance of the voltage variable capacitor D8 to increase the oscillator frequency.

Thus, the feedback circuit which is responsive to the actual output of the oscillator is employed to maintain constant the number of pulses generated by the oscillator during the reference time interval. In other words, the oscillator is adjusted so that T4 coincides with T3. With the circuit shown in FIG. 7, it has been found that the frequency of the oscillator can be maintained to an accuracy of less than one cycle. This accuracy is enhanced by the fact that the pulse train being counted by the counter 50 always begins with the same phase, and therefore the phase of the trailing edge of this pulse train will change solely due to the frequency of the oscillator and not because of uncertainty in the starting phase. With this type frequency control, voltmeter accuracies in the order of 0.01 percent are obtained.

Figure 3:
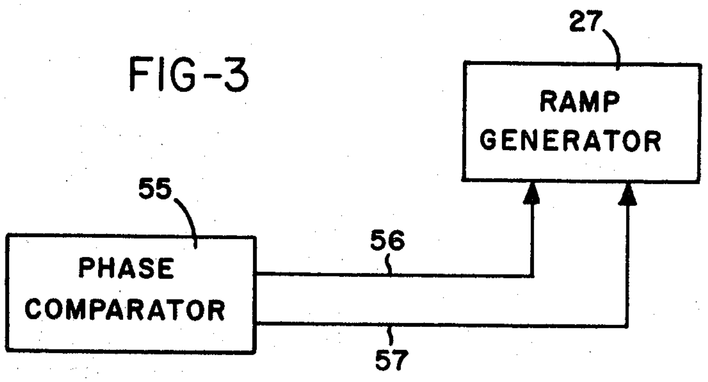
FIG. 3 is a block diagram of a modification of the invention wherein the slope of a ramp generator is controlled to maintain a fixed number of pulses during the reference time interval.

It is also possible to control the reference time interval by varying the slope of the ramp generator output voltage. This will have the effect of changing the length of the reference time interval or the length of the output which appears on terminal 42 of the sequential logic circuit 35. Referring to FIG. 3, the output from the phase comparator 55 may be applied to voltage control circuits within the ramp generator 27 to adjust the slope of the ramp generator output voltage, again to maintain a fixed number of pulses during the interval.

Using either embodiment, it is thus apparent that a constant fixed number of pulses will be generated during the reference time interval and this number of pulses will be independent of the actual slope of the ramp generator output voltage.

Referring again to FIGS. 2 and 5, the output from terminals 42 and 40 of the sequential logic circuit and output 52 from the counter 50 are connected to exclusive OR gate 60. The exclusive OR gate shown in FIGS. 2 and 7 will operate only if an enabling voltage is provided from terminal 42 and will produce a positive output on terminal 62 only if one, but not both, of its inputs obtains a positive value. In this case, the exclusive OR gate 60 will provide an output as shown in FIGS. 5*a* and 5*b* only during the interval T2–To in the case of positive input voltages, or To–T2 in the case of negative input voltages. In either case, the time duration of the exclusive OR output on terminal 62 will represent the magnitude of the unknown input voltage with reference to To.

Terminal 62 controls a count gate 65 through which pulses from the oscillator 45 are directed to the digital voltmeter circuit. The time during which the gate is open will determine the number of pulses which pass therethrough and therefore the magnitude of the reading which will appear on the visual indicating devices of the voltmeter.

Figure 4:
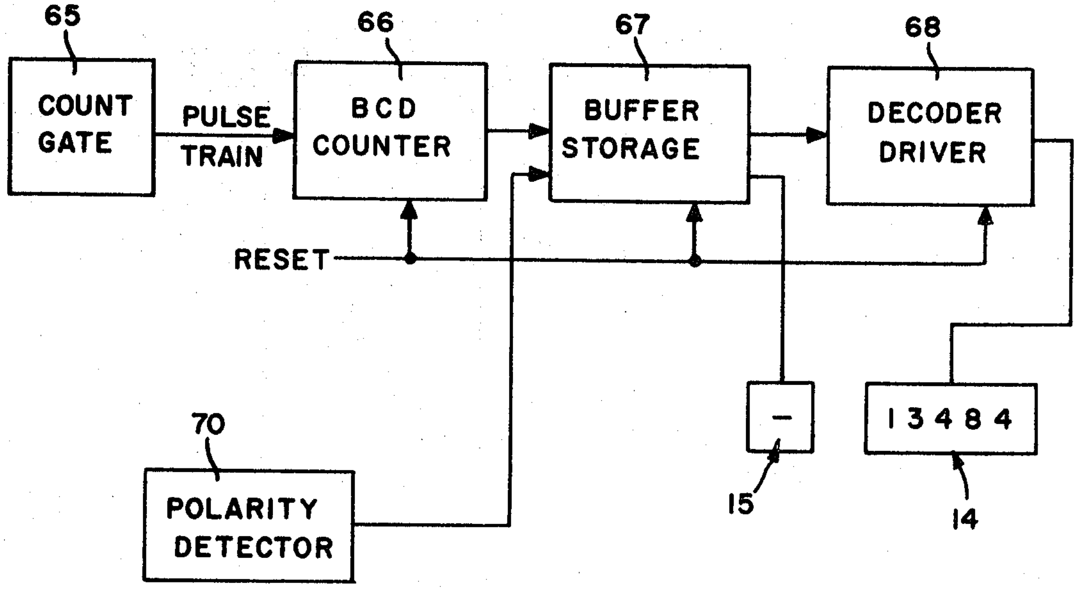
FIG. 4 is a simplified block diagram of a digital voltmeter readout circuit which converts the pulse output of the analog to digital converter circuit of this invention into physically readable form.
Figure 8:
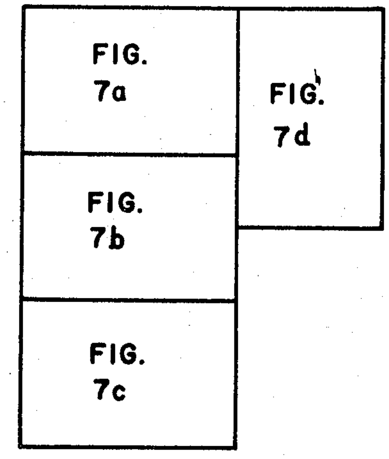

Referring to FIG. 4, the pulse output from the count gate 65 is applied to a four decade BCD counter 66 and a four decade buffer storage 67. The number stored in the buffer storage is decoded by the decoder circuit 68 which then illuminates the proper numerals on the digital display tubes 14.

Referring again to FIGS. 2 and 5, the polarity of the unknown input voltage Ein is determined by the time an output appears on terminal 62 of the exclusive OR gate with reference to the output on terminal 52 of the counter 50. If an output appears on terminal 62 before counter 50 reaches To, the unknown input voltage is positive. If the exclusive OR gate generates an output after To is indicated, the polarity is negative. A polarity detector 70 generates an output for negative voltages which is applied to the buffer storage 67, on line 72, and through that device to the polarity indicator 15.

It is to be understood that this invention is not limited to those circuits wherein the reference voltages are of equal magnitude but of opposite polarity, but the circuit described can be used with any pair of reference voltages. Furthermore, it is not essential that reference voltages bracket the unknown voltage since a time ratio is being measured as an indication of voltage.

The circuit thus described is therefore unaffected by changes in the ramp voltage slope or changes in the comparator threshold voltage. Slope variations are compensated for by the feedback circuit described above, and since only one comparator circuit is used, its threshold response will be the same for each input from the references and the unknown input.

Identification and values for the components in the electrical circuit of FIG. 7 are given below:

| | |
|---|---|
| R1, 2 | Resistor, 510K, 5%, 2W |
| R3, 5A, 6, 8A, 9, 11A, 12 | Resistor, Matched Set |
| R5, 8, 11, 64 | Resistor, 10K, 10%, 2W |
| R7, 10, 31, 32 | Resistor, 1 Meg, 10%, 1/2W |
| R13, 16, 43, 44 | Resistor, 4.7K, 10%, 1/2W |
| R14 | Resistor, 2.6K, 0.1%, 1W |
| R15 | Resistor, 9.4K, 0.1%, 1W |
| R17 | Resistor, 209.6 ohm, 0.1%, 1W |
| R18 | Resistor, 8.479K, 0.1%, 1W |
| R20, 27 | Resistor, 33 ohm, 1%, 3/4W |
| R21, 28 | Resistor, Variable, 100 ohm, 3/4W |
| R22, 26, 30, 55, 72, 83 | Resistor, 1.5K, 10%, 1/2W |
| R23 | Resistor, 5.933K, 0.1%, 1W |
| R25 | Resistor, 1.467K, 0.1%, 1W |
| R29 | Resistor, 1.242K, 0.1%, 1W |
| R33, 34, 36, 37, 38, 39 | Resistor, 12K, 10%, 1/2W |
| R35 | Resistor, 120K, 10%, 1/2W |
| R40, 41, 42 | Resistor, 2.2K, 10%, 1/2W |
| R45 | Resistor, Variable, 20K, 2W |
| R46 | Resistor, 45.3K, 1%, 3/4W |
| R47, 65, 91 | Resistor, 100 ohm, 5%, 1/2W |
| R48, 52, 53 | Resistor, 680K, 10%, 1/2W |
| R49, 54 | Resistor, 100K, 10%, 1/2W |
| R50 | Resistor, 330 ohm, 10%, 1/2W |
| R51, 63, 89 | Resistor, 15K, 10%, 1/2W |
| R56, 57, 60, 61, 62, 74 | Resistor, 10K, 10%, 1/2W |
| R58 | Resistor, 3.3 Meg, 10%, 1/2W |
| R71 | Resistor, 22K, 10%, 1/2W |
| R73 | Resistor, 330 ohm, 10%, 1/2W |
| R75, 78 | Resistor, 3.3K, 10%, 1/2W |
| R76, 77, 80, 88 | Resistor, 1K, 10%, 1/2W |
| R79, 81, 82 | Resistor, 1.2K, 10%, 1/2W |
| R84 | Resistor, 270 ohm, 10%, 1/2W |
| R85 | Resistor, 47K, 10%, 1/2W |
| R86 | Resistor, 560 ohm, 10%, 1/2W |
| R87 | Resistor, 17.4K, 1%, 3/4W |
| R90 | Resistor, 16.2K, 1%, 3/4W |
| R92 | Resistor, 221K, 1%, 3/4W |
| R93 | Resistor, 27.4K, 1%, 3/4W |
| R94 | Resistor, 130K, 1%, 3/4W |
| R95 | Resistor, 820 ohm, 10%, 1/2W |
| R96 | Resistor, 39K, 10%, 1/2W |
| C1 | Capacitor, Mylar, 0.001 μfd @ 600 VDC |
| C2, 7, 8, 20, 24 | Capacitor, Mylar, 0.01 μfd @ 400 VDC |
| C3, 13 | Capacitor, Mylar, 0.005 μfd @ 600 VDC |
| C4 | Capacitor, Mica, 220 Pfd @ 500 VDC |
| C5, 6, 9, 17, 18, 23 | Capacitor, Mylar, 0.02 μfd @ 400 VDC |
| C10, 15, 16 | Capacitor, Mica, 10 Pfd @ 500 VDC |
| C11 | Capacitor, Mylar, 0.05 μfd @ 600 VDC |
| C12 | Capacitor, Mica, 500 Pfd @ 500 VDC |
| C14 | Capacitor, Mylar, 3 μfd @ 100 VDC |
| C19 | Capacitor, Mica, 1500 Pfd @ 500 VDC |
| C21 | Capacitor, Tantalum, 10 μfd @ 20 VDC |
| C25 | Capacitor, Tantalum, 15 μfd @ 20 VDC |
| C26 | Capacitor, Mylar, 0.5 μfd @ 400 VDC |
| C27 | Capacitor, Mica, 300 Pfd @ 500 VDC |
| C28 | Capacitor, Mylar, 1 μfd @ 100 VDC |
| C29 | Capacitor, Mica, 75 Pfd @ 500 VDC |
| D1 | Diode, Zener, 9.4V 0.5% |
| D2, 3, 4, 5, 9, 10 | Diode, Low Leakage |
| D6, 11 | Diode, Zener, 13V 10% |
| D7 | Diode, Signal, 1N4154 |
| D8 | Diode, Zener, 13V Low Leakage |
| Q1, 8, 9, 10, 11, 12, 13, 14, 15, 27, 28 | Transistor, Signal, 2N2925 |
| Q2, 3, 4 | Transistor, "N" Channel F.E.T., U1713 |
| Q5, 6, 7, 25 | Transistor, 2N4248 |
| Q16 | Transistor, Darlington, D16P3 |
| Q17, 18 | Transistor, "N" Channel F.E.T. Matched |
| Q22, 24, 26 | Transistor, High Voltage, 2N3877 |
| Q23 | Transistor, 2N3905 |
| Q29 | Transistor, Programmable Unijunction, D13T1 |
| Q30 | Transistor, Signal, 2N2922 |
| IC1 | Integrated Circuit, Triple 3 Input Gates, MC793P |
| IC2, 6, 10, 11 | Integrated Circuit, Quad 2 Input Gates, MC717P |
| IC3 | Integrated Circuit, Transistor Array, RCA 3046 |
| IC4 | Integrated Circuit, Amplifier, MC1437L |
| IC5 | Integrated Circuit, Quad 2 Input Gates, MC724P |
| IC7, 12, 13, 14, 15, 16, 17, 18 | Integrated Circuit, Dual J-K Flip-Flop, MC776P |
| IC8 | Integrated Circuit, Triple 3 Input Gates, ML792P |
| IC9 | Integrated Circuit, Dual J-K Flip-Flop, MC790P |
| L1 | Inductor, 56 microhenry |

The analog to digital converter thus described may be used in conjunction with a voltmeter or measurement of any analog quantity by measuring the time ratio between the comparison of a ramp signal to first and second reference signals and the ramp signal to the unknown input signal. More particularly, the time ratio is determined in this invention by maintaining a constant number of pulses during a reference time interval, which is the time required for the ramp to change from a first to a second reference level, and gating a proportionate number of these same pulses which represent the unknown quantity into a digital display.

In the present invention, the number of pulses representing the unknown quantity is a direct function of its magnitude. It is to be understood, however, that offsets could be employed and that the number of pulses could also be an inverse function of the magnitude of the unknown quantity.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

What is claimed is:

1. Method for measuring an unknown input voltage comprising the steps of repeatedly generating a ramp which varies in voltage at a linear rate;

providing first and second reference voltages;

selectively comparing said ramp voltage to said first reference voltage, the unknown input voltage, and said second reference voltage during each repetition of said ramp;

determining the time between the coincidence of the ramp voltage with said first reference voltage and with said second reference voltage to obtain a reference time interval;

determining the time interval between the coincidence of said ramp voltage with the unknown input voltage and one of said reference voltages to obtain a measurement time interval; and determining the time ratio between said reference time interval and said measurement time interval;

indicating the magnitude of the unknown input voltage by reference to said time ratio and the magnitudes of said reference voltages.

2. The method of claim 1 further including the steps of generating a predetermined number of pulses during said reference time interval; and gating a number of said pulses in proportion to said time ratio to a display device to indicate the magnitude of said unknown input voltage.

3. The method of claim 2 wherein the steps of generating a predetermined number of pulses during said reference time interval includes the steps of generating a series of regularly spaced pulses;

counting the number of pulses generated during the reference time interval; and adjusting the frequency of said pulse generator so that said predetermined number of pulses occurs during said reference time interval.

4. The method of claim 3 including the steps of clamping said pulse generator into a nonoscillating state prior to said reference time interval and gating said pulse generating means into operation at the beginning of the reference time interval so that the phase of said pulse generating means at the beginning of said interval is the same for each measurement.

5. The method of claim 1 wherein said first and second reference voltages are of equal magnitude and of opposite polarity, and wherein the time of coincidence of the ramp voltage with the unknown input voltage is measured with respect to a time which is one-half of the reference time interval so that the magnitude of the unknown input voltage is directly proportional to the measured time interval.

6. The method of claim 5 wherein the polarity of the unknown input voltage is determined by whether the measured time interval starts or ends with the time which is one-half said reference time interval.

7. A drift free measuring circuit for measuring the magnitude of an unknown input signal comprising means for repeatedly providing a ramp signal which changes in magnitude at a linear rate;

means for providing a first reference signal;

means for providing a second reference signal;

means for selectively comparing said ramp to said first reference signal, the input signal and said second reference signal during each repetition of said ramp signal; and means for measuring the time ratio between the comparison of said ramp signal to said first and said second reference signals and said ramp signal to said input signal and one of said reference signals to provide a measurement of the magnitude of the unknown input signal, the measurement of said input signal thereby being determined solely by reference to said first and second reference signals and independent of the slope of said ramp signal.

8. The device of claim 7 wherein said means for measuring the time ratio includes means for generating a series of regularly spaced pulses;

counter means connected to said pulse generating means to divide the number of said pulses by a fixed number;

means for initiating the counting sequence upon an output from said comparator means indicating the coincidence of said ramp signal and said first reference signal;

means for comparing the output of said counter with the output of said comparator when indicating the coincidence of said ramp signal and said second reference signal;

feedback means connected to said pulse generating means and responsive to said comparator means for maintaining the number of said pulses constant during the reference time interval between the coincidence of said ramp with said first reference signal and with said second reference signal.

9. The device of claim 8 wherein said pulse generating means is a voltage controlled oscillator and wherein said comparator means controls the frequency of said oscillator to maintain a fixed number of pulses within said reference time interval.

10. The device of claim 8 wherein said first and second reference signals are of equal magnitude and of opposite polarity.

11. The device of claim 8 further including means responsive to the coincidence of said ramp signal with said unknown input signal and to said counter means for gating the output of said pulse generating means to a digital readout counter with the number of pulses so gated being directly proportional to the magnitude of said unknown input signal with reference to zero.

12. A drift free voltage measuring circuit for indicating the magnitude and polarity of an unknown input comprising means for providing a ramp voltage which changes in magnitude at a linear rate between a positive and a negative value;

means for providing first and second reference voltages having equal magnitudes and opposite polarities;

means for selectively comparing said ramp voltage to said first reference voltage, the unknown input voltage, and said second reference voltage;

means for generating regularly spaced pulses;

counter means responsive to the output from said pulse generating means for counting the number of pulses generated in a reference time interval between the coincidence of said ramp voltage with said first and said second reference voltages;

feedback means responsive to said counter means and said comparing means for controlling the frequency of said pulse generating means to maintain the number of said pulses in the reference time interval at a predetermined number;

means for gating a portion of the output of said pulse generating means to a digital display device in response to the coincidence of said ramp voltage with said unknown input voltage and in response to an output from said counter means representing one-half of said predetermined number of pulses thereby to provide a number of pulses to the display device which is a direct function of the magnitude of the voltage of said unknown input with respect to zero; and means for determining the sequence of occurrence of the coincidence of the ramp voltage with said unknown input and the output from said counter representing one-half said predetermined number of pulses to provide an indication of the polarity of the unknown input.

13. The measuring circuit of claim 12 further including means for clamping said pulse generating means into a nonoscillating state prior to said reference time interval and for gating said pulse generating means into operation upon the coincidence of said ramp voltage with said first reference voltage so that the phase of the output of said pulse generating means at the beginning of said reference time interval is the same for each voltage measurement.

* * * * *